Patented Feb. 28, 1939

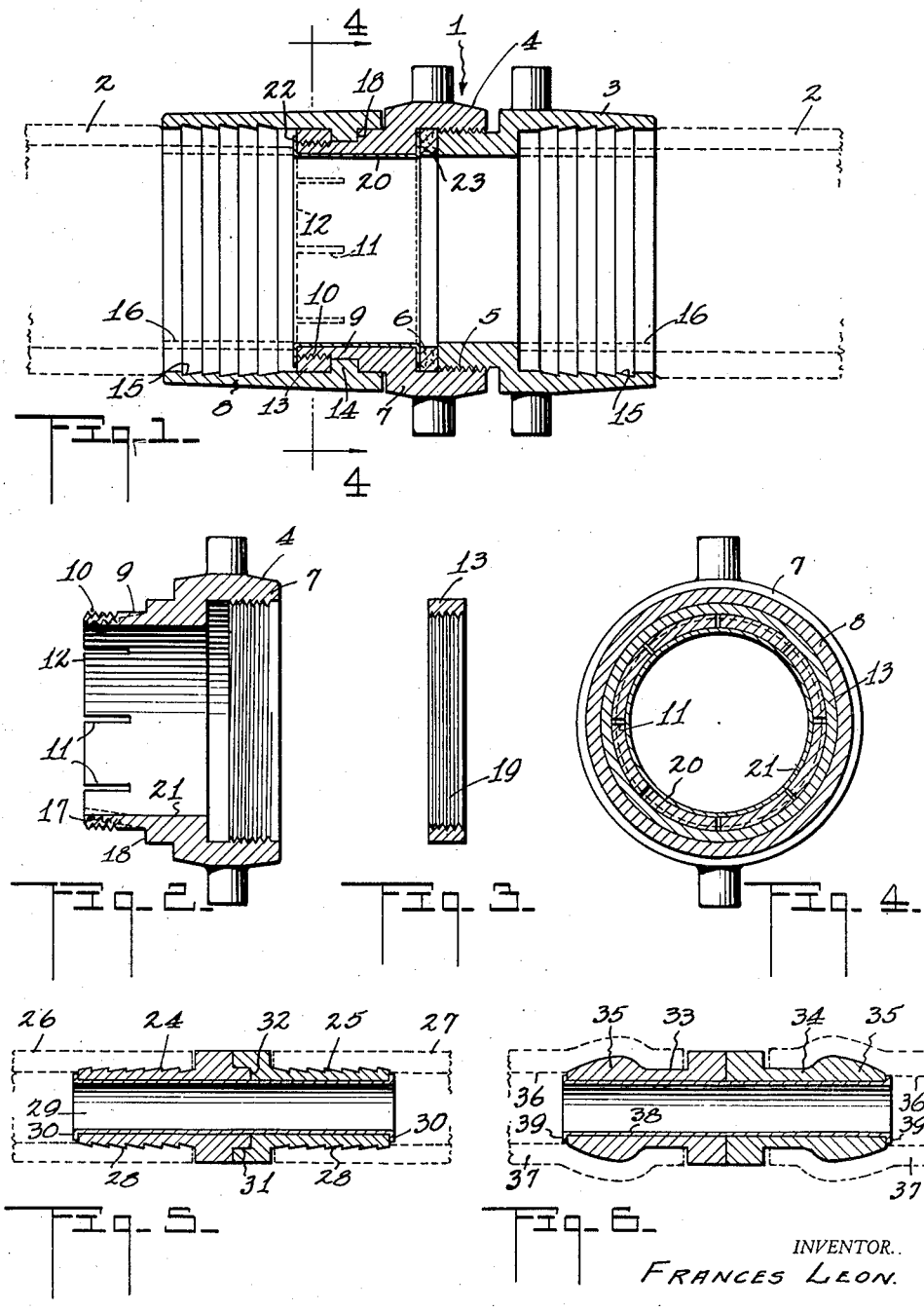

2,148,566

UNITED STATES PATENT OFFICE 2,148,566

SWIVEL JOINT HOSE COUPLING

Frances Leon, Oakland, Calif.

Application June 23, 1937, Serial No. 149,876

5 Claims. (Cl. 285—9)

The present invention relates to improvements in swivel-joint hose couplings, and has as its principal object the provision of a coupling having a swiveled portion, which allows for free turning movements of the coupling sections. This prevents the formation of loops or kinks in the hose during the use thereof, and especially when coupling the hose to a hydrant or securing two hose sections together.

A further object is to provide a swivel hose coupling that is constructed in such a manner that component parts may be readily assembled into a compact unit, the parts being interfitted to seal the coupling against leakage at the swivel portion thereof.

It will be noted as the specification proceeds that my coupling is adapted for use in connection with the present day fire-fighting equipment. In this respect it will be noticed that but one movable member is required to provide a free swivel movement for the fire hose sections at each connection where the hose is secured.

In a like manner, my swivel-joint coupling will perform an equally important service in the mining industry, wherein long lengths of hose are employed under high pressures, which would instantly destroy a section of hose should it become temporarily obstructed by reason of a short bend or kink. The flexible swivel movement of my coupling entirely eliminates the formation of kinks in the hose.

It is often necessary to employ a very heavy hose of a non-collapsible nature, such as in the winery and in the food industries. Under such conditions, the labor of coupling is often very difficult due to the stiffness of the hose, and its resistance to compensate with any degree of pliability when being connected often causes loosening at the connecting joints when the hose is placed under pressure. My coupling may be employed to overcome these disadvantages.

The above important applications have been mentioned to illustrate the many important industries where flexible hose is a most essential part of the production equipment, and wherein my coupling may be utilized in overcoming the difficulties encountered in the handling and general usages of hose. My coupling may be employed in the oil industry, garden hoses and the like, and I do not wish to be limited in this respect.

Other objects and advantages of my invention will appear as the specification proceeds, and the novel features thereof will be particularly set forth in the claims hereto appended.

For a better understanding of my invention, reference should be had to the accompanying drawing, forming part of this application, in which:

Figure 1 is a longitudinal section through my hose coupling;

Figure 2 an axial section through a body member of my coupling;

Figure 3 a similar view taken through the connecting ring which I employ;

Figure 4 a transverse sectional view along line 4—4 of Figure 1; and

Figures 5 and 6 longitudinal sectional views through modified forms of my coupling.

While I have shown only the preferred forms of my invention, I wish to have it understood that various changes or modifications may be made within the scope of the appended claims without departing from the spirit of the invention.

In carrying my invention into practice I provide a coupling 1, which is adapted to connect the hose ends 2 in alined relation, the coupling being constructed so as to permit one hose to freely turn with respect to the other.

The coupling consists of a male section 3 that is threaded into a female section 4, as at 5, a suitable washer 6 being introduced between the coupling sections.

The female section 4 consists of a body member 7, which is rotatably secured within a sleeve 8 as shown in Figure 1. The body member 7 has a reduced end 9 that is formed with annular still threads 10, and this reduced end is slotted as at 11 from the end 12 thereof. An annular ring 13 engages with the still threads 10 when the coupling is assembled, and coacts with an internal shoulder 14 fashioned in the sleeve 8 to hold the latter upon the body member 7 with freedom of rotary movement.

It will be noted that the male section 3 and the sleeve 8 are formed with annular internal corrugations 15 on the inner bores thereof. The hose ends 2 are secured within the male section 3 and the sleeve 8 by means of expandable rings 16, the latter serving to hold the hose ends in engagement with the corrugations 15 in the conventional manner.

The body member 7 is illustrated in its normal position in Figure 2. Prior to assembling the coupling, the reduced end 9 is forced inwardly or crimped by external pressure, applied in any suitable manner, and producing a taper indicated by the dotted lines 17. The slots 11 facilitate this inward-bending of the end 9. The reduced end 9 is then inserted into the sleeve 8 until the shoulder 18 of the body member 7 bears against the internal shoulder 14 on the sleeve.

With the body member 7 thus telescoped within the sleeve 8, the ring 13 is then introduced over the tapered and reduced end 9 until the ring contacts the internal shoulder 14. A suitable tool, (not shown) is used for expanding the reduced end 9 until the still threads 10 thereon enter similar still threads 19 formed in the bore of the ring. The slots 11 are reopened by the outward expanding of the end 9 and the body member 7 takes the shape illustrated in Figure 2 of the drawing.

The parts 7 and 8 are now anchored together, but they are free to rotate with respect to each other and will allow relative turning movement between the alined hose ends 2. The slots 11 are then closed by any suitable means, and by way of illustration I have shown a tubular liner 20, which snugly engages with the bore 21 of the member 7.

The ends of the liner 20 are turned outwardly to provide flanges 22 and 23 which serve to anchor the liner in place. The flange 22 also prevents leakage of fluid along the threads 10 and 19. It will be understood that the slots 11 could be closed by welding.

In Figure 5 I show the tubular parts 24 and 25 as being arranged in alined relation, and hose ends 26 and 27 are secured thereto respectively by annular buttress threads 28. A tubular liner 29 extends through the bores of the parts 24 and 25, and the ends of the liner are flanged outwardly as at 30 to secure the two parts together, while allowing free turning movement therebetween.

A projection 31 on the part 24 may be provided, if desired, and is accommodated in a recess 32 in the part 25 as shown in the drawing. This form of my coupling is particularly well adapted for small hoses, such as are used in gardens.

Substantially the same construction is followed in the form shown in Figure 6. The tubular parts 33 and 34, however, are formed with bulged sections 35 to engage with the bores 36 of the flexible tube ends 37. The parts 33 and 34 are held together by means of a liner 38 having flanged ends 39 bearing against opposite ends of the aligned parts 33 and 34, the latter being adapted for free turning movement with respect to each other.

I claim:

1. A swivel-joint hose coupling comprising a pair of tubular sections telescoped one within the other with freedom of turning movement therebetween, means limiting the inward telescoping movement of the outer section upon the inner section to a desired end position, means for securing conduits to said sections, the outer section having an annular internal shoulder fashioned in the bore thereof, and a ring secured to the inner section and coacting with said shoulder for holding the sections together, the ring being dimensioned for sliding along the bore of the outer section from the outer end of the latter and into engagement with the inner section after the sections have been assembled together.

2. A swivel-joint hose coupling comprising a pair of tubular sections telescoped one within the other with freedom of rotary movement therebetween, means limiting the inward telescoping movement of the outer section upon the inner section to a desired end position, means for securing conduits to said sections the outer section having an annular internal shoulder fashioned in the bore thereof and the inner section having slots in one end thereof to facilitate inward crimping of said end, a ring mounted on said end and coacting with said shoulder for holding the sections together, the outer section being constructed to permit introduction of the ring over the inner section after the sections have been assembled, and means securing the ring to said end when the latter is expanded.

3. A swivel-joint hose coupling comprising a pair of tubular sections telescoped one within the other with freedom of rotary movement therebetween, the outer section having an annular internal shoulder fashioned in the bore thereof and the inner section having slots in one end thereof to facilitate inward crimping of said end, a ring mounted on said end and coacting with said shoulder for holding the sections together, and means securing the ring to said end when the latter is expanded and means for forming a closure over the slots to prevent leakage of fluid therethrough.

4. A swivel-joint hose coupling comprising a pair of tubular sections telescoped one within the other with freedom of turning movement therebetween, means limiting the inward telescoping movement of the outer section upon the inner section to a desired end position, and means applied to the inner section for locking the sections in said end position and including a locking member dimensioned for sliding along the bore of the outer section from the outer end of the latter and into engagement with the inner section after the sections have been assembled together.

5. A swivel-joint hose coupling comprising a pair of tubular sections telescoped one within the other, the outer section having an annular internal ring in its bore spaced from the end thereof through which the inner section is introduced so as to leave a bearing surface, the inner section having a reduced neck defining a shoulder abutting one face of the internal ring to limit the inward insertion of the inner section, the larger portion of the inner section having a snug fit with said bearing surface of the outer section, the reduced neck of the inner section projecting through and beyond said internal ring, and a clamping ring secured to the projecting end of the reduced neck and bearing against the face of said internal ring opposite the shoulder of the inner section and holding the two sections together in fluid-tight relation.

FRANCES LEON.